(12) United States Patent
Homa et al.

(10) Patent No.: US 8,385,692 B2
(45) Date of Patent: Feb. 26, 2013

(54) ON-LINE FIBER BRAGG GRATING DITHERING

(75) Inventors: Daniel Homa, Blacksburg, VA (US); Brooks Childers, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 164 days.

(21) Appl. No.: 12/472,808

(22) Filed: May 27, 2009

(65) Prior Publication Data

US 2010/0303403 A1 Dec. 2, 2010

(51) Int. Cl.
*G02B 6/00* (2006.01)
*G02B 1/12* (2006.01)

(52) U.S. Cl. ............................................. 385/12

(58) Field of Classification Search .............. 385/12–13, 385/128
See application file for complete search history.

(56) References Cited

U.S. PATENT DOCUMENTS

| | | | |
|---|---|---|---|
| 4,473,273 A | 9/1984 | Hodge | |
| 2002/0008518 A1 | 1/2002 | Arz et al. | |
| 2004/0113056 A1* | 6/2004 | Everall et al. | 250/227.23 |
| 2006/0289724 A1* | 12/2006 | Skinner et al. | 250/221 |
| 2007/0133925 A1 | 6/2007 | Bates et al. | |
| 2007/0258330 A1 | 11/2007 | Berg et al. | |
| 2009/0202192 A1* | 8/2009 | Taverner et al. | 385/12 |
| 2010/0080502 A1* | 4/2010 | Nishikawa et al. | 385/12 |
| 2010/0296080 A1* | 11/2010 | Nishikawa et al. | 356/128 |

FOREIGN PATENT DOCUMENTS

| | | |
|---|---|---|
| EP | 0698582 | 2/1996 |
| EP | 0698582 A2 | 2/1996 |
| EP | 0698582 B1 | 11/1999 |
| EP | 2060933 A2 | 5/2009 |
| WO | 2008111320 A1 | 9/2008 |

OTHER PUBLICATIONS

R.J. Espejo, et al. "Analysis of a Fiber Bragg Grating Writing Process using Low-Coherence Interferometry and Layer-Peeling". National Institute of Standards and Technology Optoelectronics Division. retrieved on Jun. 22, 2009; retrieved from the Internet www.boulder.nist.gov/div815/81503_pubs/OFSDocs/Espejo-SOFM-04.pdf.
Notification of Transmittal of the International Search Report of the International Searching Authority, or the Declaration; PCT/US2010/034737; Jan. 27, 2011.
Great Britain Office Action for GB Application No. 1120163.9, dated Jun. 8, 2012, pp. 1-3.

* cited by examiner

*Primary Examiner* — Eric Wong
(74) *Attorney, Agent, or Firm* — Cantor Colburn LLP (57) ABSTRACT

An apparatus for determining a property, the apparatus including: an optical fiber having a series of fiber Bragg gratings, each fiber Bragg grating in the series being characterized by a light reflection frequency at which the fiber Bragg grating reflects light; wherein: the light reflection frequency for each fiber Bragg grating is different from the light reflection frequency of each adjacent fiber Bragg grating to minimize resonance of light between at least two of the fiber Bragg gratings in the series; at least two fiber Bragg gratings in the series have light reflection frequencies that overlap; and a change in the light reflection frequency of each fiber Bragg grating in the series is related to the property at the location of the each fiber Bragg grating.

17 Claims, 6 Drawing Sheets

FIG. 1

UPHOLE
DOWNHOLE

FIG. 5

ON-LINE FIBER BRAGG GRATING DITHERING

BACKGROUND OF THE INVENTION

1. Field of the Invention

The invention disclosed herein relates to measuring strain and, in particular, to measuring the strain with an optical fiber.

2. Description of the Related Art

Hydrocarbons are generally recovered through boreholes penetrating reservoirs of the hydrocarbons. Various types of structures may be disposed in the boreholes for the recovery process. During well completion, one type of structure known as a casing or tubular is disposed in a borehole. The casing, similar to a pipe, is used to contain the hydrocarbons flowing to the surface of the earth for recovery.

Structures such as casings disposed in boreholes can be exposed to harsh environments. The harsh environments include high temperature, high pressure, and high stress. The high stress can result from the high temperature, the high pressure, high loads or high vibration. When exposed to the high stress, the structure can experience strain. Because of the high cost of well completion, it is important to monitor the strains experienced by the downhole structures to prevent damage. Thus, strain sensors may be attached to the structure at various points to monitor the strains.

One type of strain sensor uses an optical fiber to measure the strains experienced at various points along the optical fiber. Because the optical fiber is attached to the structure, the optical fiber will experience the same strain as the structure.

In general, a series of identical fiber Bragg gratings is etched into the optical fiber. Each fiber Bragg grating reflects light at a certain frequency depending on such factors as the magnitude of the refractive index changes in the optical fiber and the distance between the refractive index changes. Thus, as the optical fiber experiences the strains experienced by the structure, the distance between the refractive index changes causing the frequency of the reflected light to change. Measuring a change in the frequency of the reflected light can then be related to the strain experienced by the structure.

Thousands of fiber Bragg gratings can be etched into one optical fiber to measure strains at hundreds or thousands of locations on a structure. Unfortunately, by having many fiber Bragg gratings etched into one optical fiber, a point is reached when the total reflectivity of the optical fiber is about fifteen to twenty percent. When this point is reached, "ringing" may occur. Ringing is an optical phenomenon wherein light undergoes multiple reflections within the optical fiber. That is the fiber Bragg gratings begin to act as an optical cavity to continuously reflect light between the gratings. When ringing occurs, it is difficult to accurately measure the frequency of the reflected light from each grating and to determine the associated strain.

Therefore, what are needed are techniques to measure strains experienced by a structure downhole. Preferably, the techniques minimize the probability of ringing occurring.

BRIEF SUMMARY OF THE INVENTION

Disclosed is an apparatus for determining a property, the apparatus including: an optical fiber having a series of fiber Bragg gratings, each fiber Bragg grating in the series being characterized by a light reflection frequency at which the fiber Bragg grating reflects light; wherein: the light reflection frequency for each fiber Bragg grating is different from the light reflection frequency of each adjacent fiber Bragg grating to minimize resonance of light between at least two of the fiber Bragg gratings in the series; at least two fiber Bragg gratings in the series have light reflection frequencies that overlap; and a change in the light reflection frequency of each fiber Bragg grating in the series is related to the property at the location of the each fiber Bragg grating.

Also disclosed is a method for determining a property, the method including: disposing an optical fiber having a series of fiber Bragg gratings at a location of the property, each fiber Bragg grating in the series being characterized by a light reflection frequency at which the fiber Bragg grating reflects light, wherein: the light reflection frequency for each fiber Bragg grating is different from the light reflection frequency of each adjacent fiber Bragg grating to minimize resonance of light between at least two of the fiber Bragg gratings in the series, at least two fiber Bragg gratings in the series have light reflection frequencies that overlap, and a change in the light reflection frequency of each fiber Bragg grating in the series is related to the property at the location of the each fiber Bragg grating; determining a change in the light reflection frequency for at least one of the fiber Bragg gratings in the series resulting from a measurement of the property; and relating the change to the property.

Further disclosed is a method for producing a sensor for sensing a property, the method including: drawing an optical fiber sensitive to ultraviolet light; changing an angle of a phase mask with respect to the optical fiber; and illuminating the optical fiber with ultraviolet light through the phase mask to produce a series of fiber Bragg gratings; wherein: the light reflection frequency for each fiber Bragg grating is different from the light reflection frequency of each adjacent fiber Bragg grating to minimize resonance of light between at least two of the fiber Bragg gratings in the series, each fiber Bragg grating in the series being characterized by a light reflection frequency at which the fiber Bragg grating reflects light; at least two fiber Bragg gratings in the series have light reflection frequencies that overlap; and a change in the light reflection frequency of each fiber Bragg grating in the series is related to the property at the location of the each fiber Bragg grating.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Disclosed are exemplary embodiments of techniques for determining a strain experienced by a structure disposed in a borehole penetrating the earth. The techniques, which include apparatus and method, call for determining the strain using an optical fiber having a series of fiber Bragg gratings etched into the optical fiber in such a way as to minimize the risk of ringing. A fiber Bragg grating is made with a number of spatial periodic changes in the refractive index of the optical fiber. The term "ringing" relates to light undergoing multiple reflections or resonating between at least two fiber Bragg gratings similar to light resonating in an optical cavity. The resonating limits the light reflected by a fiber Bragg grating from leaving the optical fiber at the end where the light entered.

Associated with each fiber Bragg grating is a light reflection frequency at which the fiber Bragg grating reflects light. The optical fiber is attached to the structure such that a strain experienced by the structure is also experienced by the optical fiber. As the optical fiber experiences the strain, the dimensions of the fiber Bragg grating at the strain will change. The changing dimensions in turn will cause the light refection frequency to change. The strain can then be related to the change in the light reflection frequency. Ringing, though, makes it difficult to measure the frequency of the reflected light and, thus, makes it difficult to measure the strain.

While the discussion is presented with respect to a fiber optic sensor for measuring strain, the fiber optic sensor can also be used to measure other properties such as temperature or pressure, as non-limiting examples.

As determined by experimentation, ringing frequently occurs when the total reflectivity of the optical fiber as a whole exceeds about fifteen to twenty percent. The teachings disclosed herein call for using an optical fiber having fiber Bragg gratings in which adjacent fiber Bragg gratings have different light reflecting frequencies. In particular, the light reflection frequencies vary (i.e., dither) within a range defined by a minimum light reflection frequency and a maximum light reflection frequency and, thus, the light reflection frequencies of non-adjacent fiber Bragg gratings can overlap or be the same either prior to or during a measurement. The varying of the light reflection frequencies in turn decreases the total reflectivity of the optical fiber and, thus, decreases the probability of ringing occurring.

Figure 1:
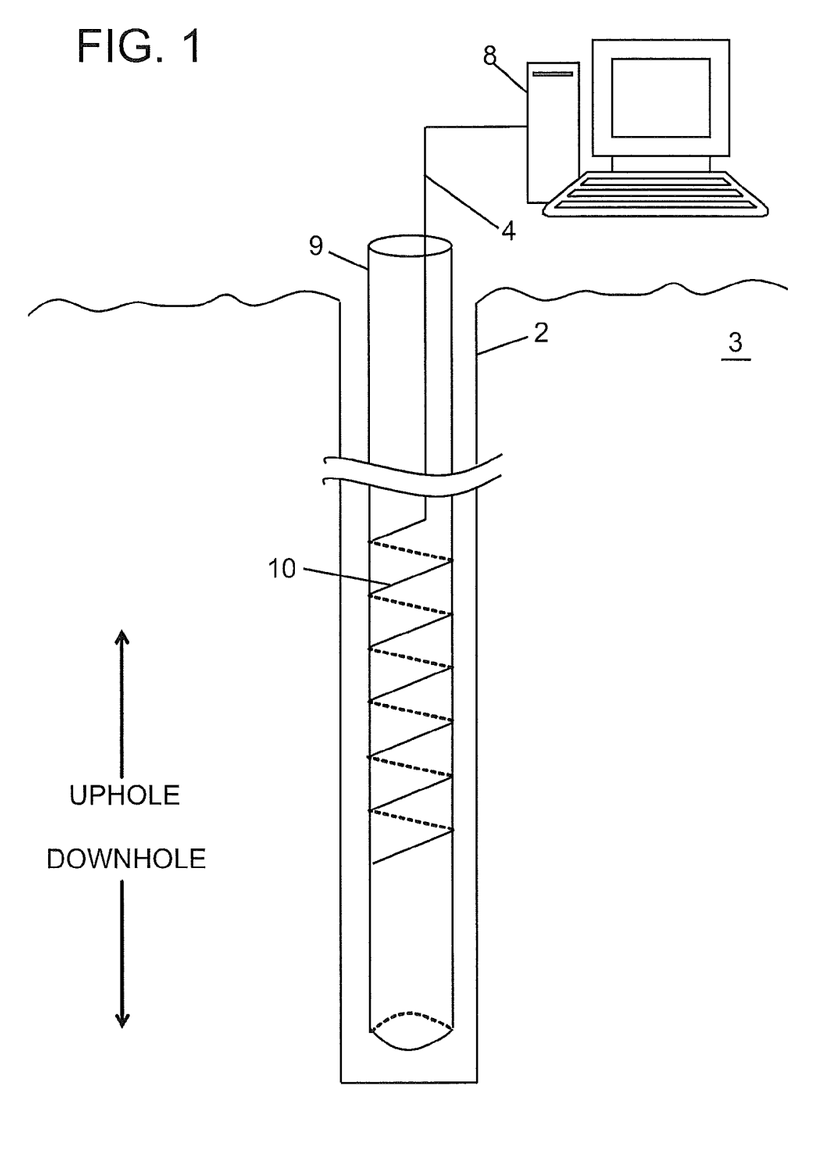
FIG. 1 illustrates an exemplary embodiment of a fiber optic strain sensor disposed at a structure in a borehole penetrating the earth.

Reference may now be had to FIG. 1. FIG. 1 illustrates an exemplary embodiment of a fiber optic strain sensor 10 coupled to a structure 9 disposed in a borehole 2 penetrating the earth 3. In the embodiment of FIG. 1, the structure 9 is a casing or tubular used for the production of hydrocarbons. The fiber optic strain sensor 10 is wrapped around the casing 9 in a spiral shape. To measure the strain, the fiber optic strain sensor 10 includes a series of fiber Bragg gratings etched into an optical fiber. In order to interrogate each fiber Bragg grating, an optical frequency domain reflectometry (OFDR) processor 8 is coupled to the fiber optic strain sensor 10 via fiber optic cable 4. The OFDR processor 8 can read and/or record the strain measured by each fiber Bragg grating and provide the reading as output to an operator.

Figure 2:
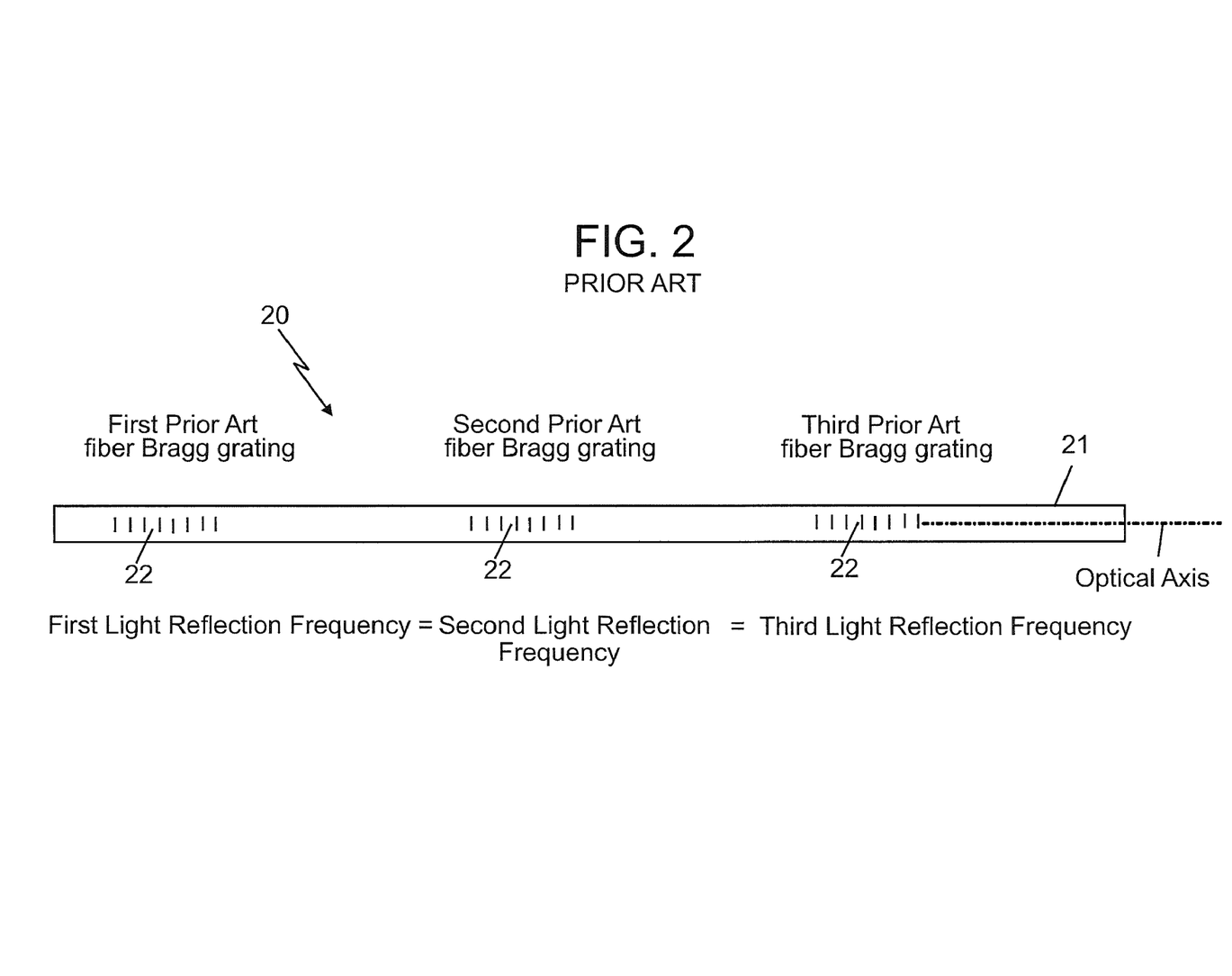
FIG. 2 depicts aspects of a prior art fiber optic strain sensor.

In order to provide contrast to the techniques presented herein, a prior art strain sensor 20 is shown in FIG. 2. The prior art strain sensor 20 includes an optical fiber 21 with a conventional series of fiber Bragg gratings 22 wherein each of the gratings 22 has the same light reflecting frequency. In the embodiment of FIG. 2, each change in refractive indices is etched uniformly across the optical fiber 21 and perpendicular to the optical axis of the optical fiber 21.

Figure 3:
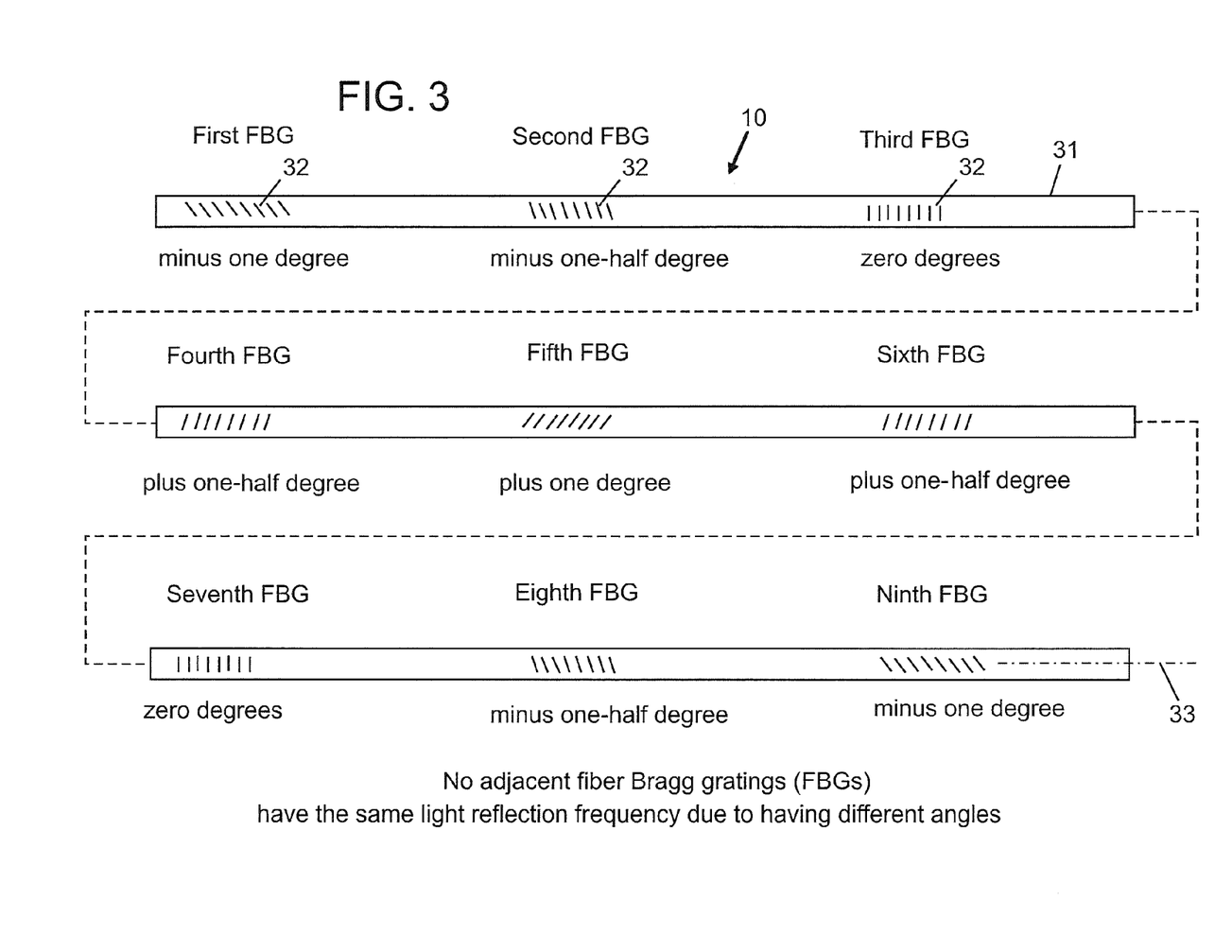
FIG. 3 depicts aspects of the fiber optic strain sensor configured to minimize ringing.

FIG. 3 depicts aspects of the fiber optic strain sensor 10. Referring to FIG. 3, the fiber optic strain sensor 10 includes an optical fiber 31. Etched into the optical fiber 31 are a series of fiber Bragg gratings 32. Each fiber Bragg grating 32 has a light reflection frequency that is different from the light reflection frequency of adjacent fiber Bragg gratings 32. The light reflecting frequencies are different because adjacent fiber Bragg gratings 32 have the changes in the refractive index of the optical fiber 31 at different angles etched across the optical fiber 31 with respect to an optical axis 33.

For example, referring to FIG. 3, the angle of the change in the refractive index across the optical fiber 31 for the first fiber Bragg grating (FBG) 32 is minus one degree (shown exaggerated) where zero degrees is perpendicular to the optical axis 33. The second FBG 32 has an angle of minus one-half degree. The third FBG 32 has an angle of zero degrees. The fourth FBG 32 has an angle of plus one-half degree. The fifth FBG 32 has an angle of plus one degree. The sixth FBG has an angle of plus one-half degree. The seventh FBG 32 has an angle of zero degrees. The eighth FBG 32 has an angle of minus one-half degree. The ninth FBG 32 has an angle of minus one-half degree, and so on. The oscillation or dithering of the angle of the refractive index across the optical fiber 31 continues for the length of the optical fiber 31. This oscillation or dithering keeps the light reflection frequencies within a range bounded by a minimum light reflection frequency and a maximum light reflection frequency. The light reflection frequency continuously varying within the range in combination with a low intensity of refractive index changes provides for keeping the total reflectivity of the optical fiber 31 below fifteen to twenty percent when the optical fiber 31 has hundreds or thousands of the fiber Bragg gratings 32.

In another embodiment, the difference in the light reflection frequencies of adjacent fiber Bragg gratings 32 is attributed to the adjacent fiber Bragg gratings 32 having different "chirping" (i.e., different series of spacings between changes of the refractive index).

Figure 4:
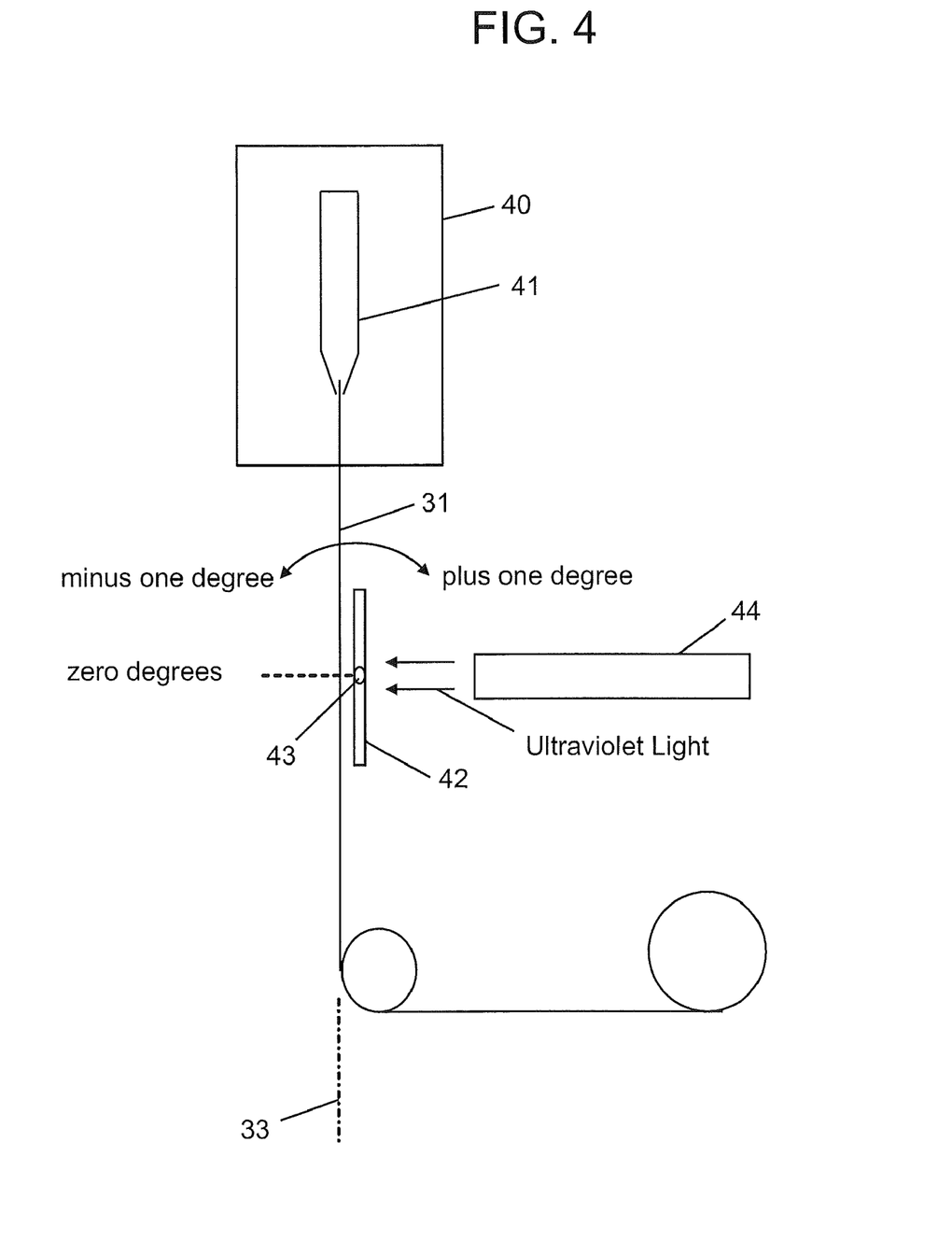
FIG. 4 depicts aspects of fabricating the fiber optic strain sensor.

FIG. 4 depicts aspects of fabricating the fiber optic strain sensor 10. Referring to FIG. 4, the optical fiber 31 (sensitive to ultraviolet light) is drawn from a furnace 40 and a preform 41. Near the optical fiber 31 is a phase mask 42 with oscillates about an axis 43 perpendicular to the optical axis 33. In the embodiment of FIG. 1, the phase mask 42 oscillates between minus one degree and plus one degree where zero degrees is perpendicular to the optical axis 33. An ultraviolet laser 44 illuminates the optical fiber 31 through the phase mask 42 to create an interference pattern. The interference pattern of ultraviolet light etches a spatial change in the refractive index of the optical fiber 31. In general, the illumination is performed by a flash or pulse from the ultraviolet laser 44. The continuous oscillation of the phase mask 42 provides the dithering of the angle of the change in the refractive index across the optical fiber 31.

Figure 5:
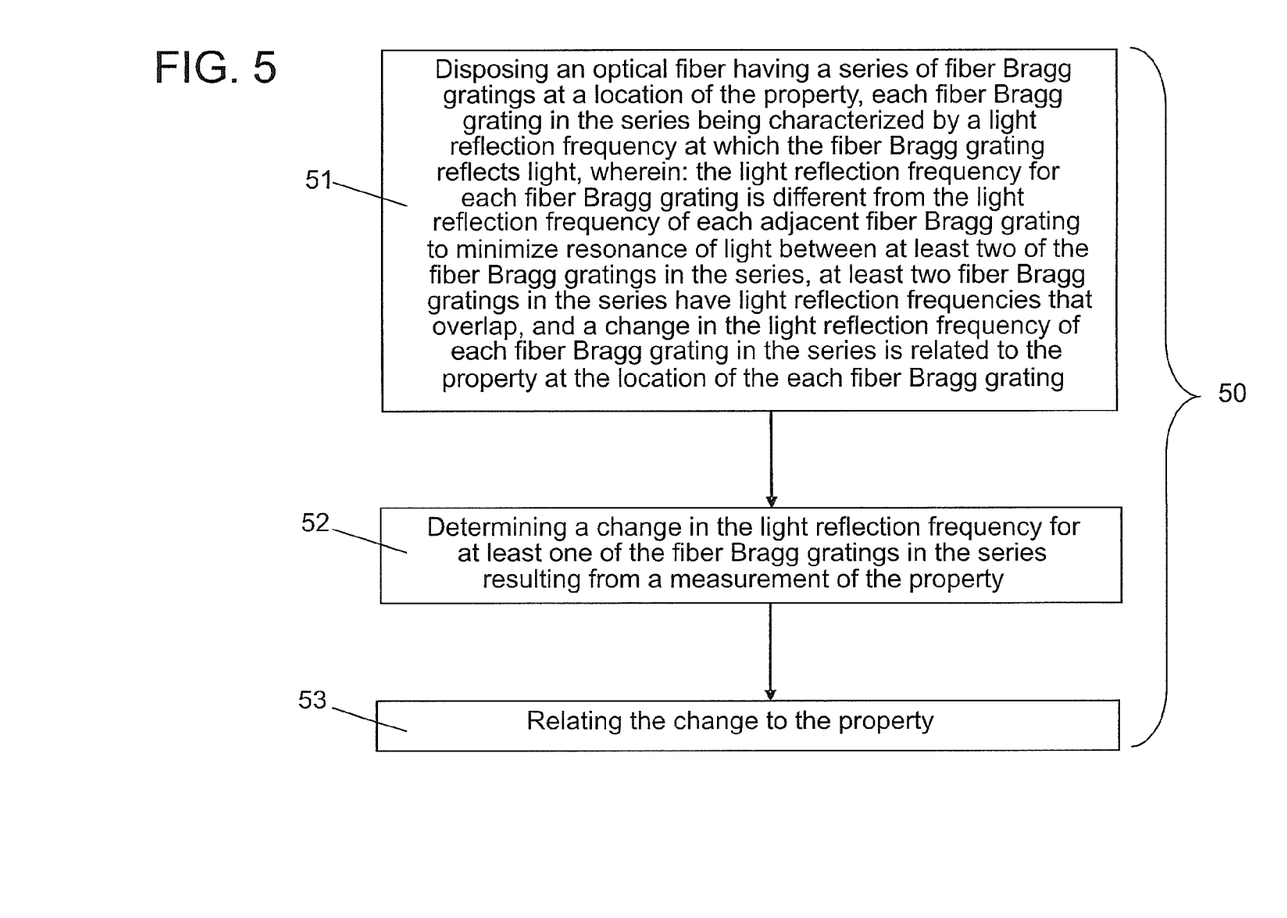
FIG. 5 presents an example of a method for determining a property.

FIG. 5 presents an example of a method 50 for determining a property. The method 50 calls for (step 51) disposing the fiber optic sensor 10 at a location of the property. Further, the method 50 calls for (step 52) determining a change in the light reflection frequency for at least one of the fiber Bragg gratings 32 in the series of the fiber Bragg gratings in the optical fiber 31 resulting from a measurement of the property. Further, the method 50 calls for (step 53) relating the change to the property.

Figure 6:
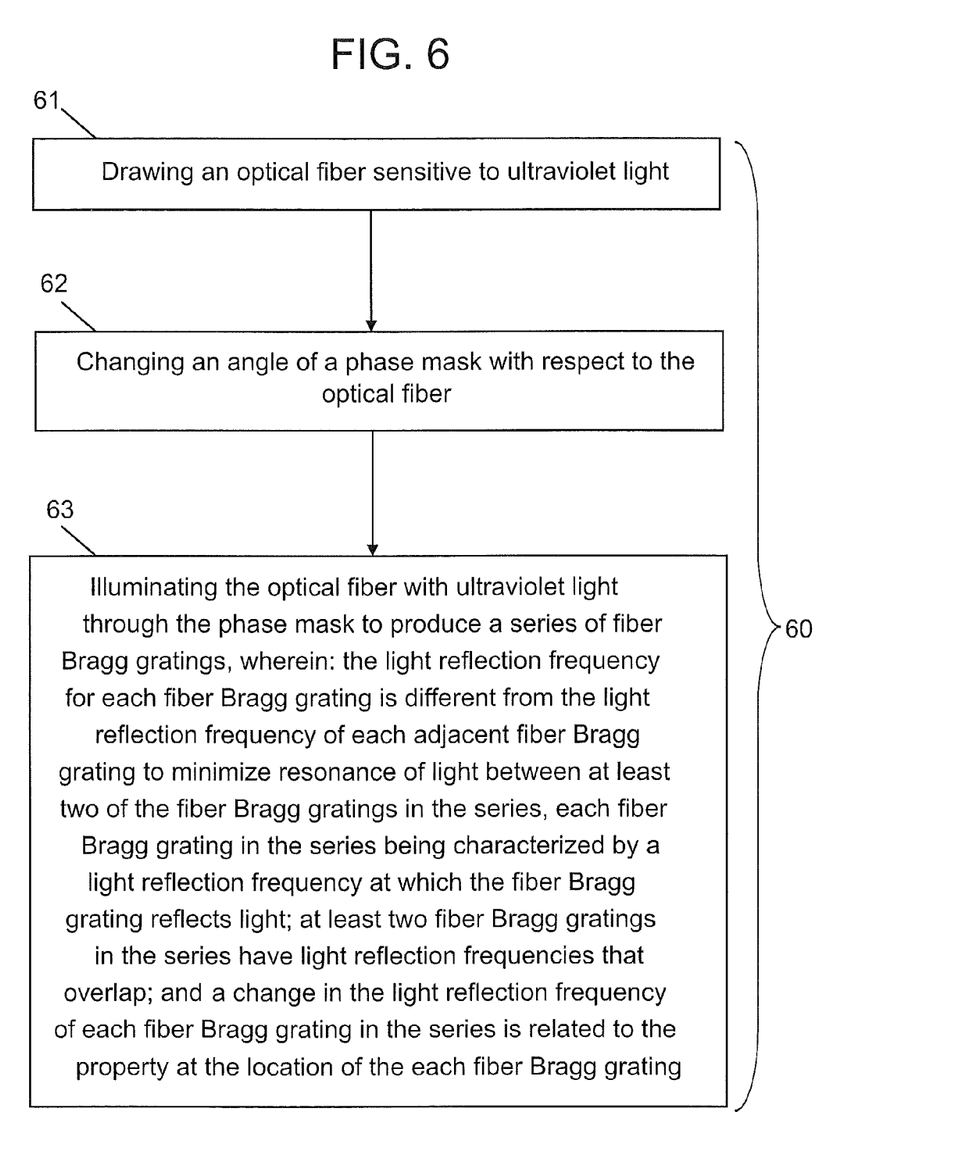
FIG. 6 presents an example of a method for producing a sensor for sensing the property.

FIG. 6 presents an example of a method 60 for producing the fiber optic sensor 10 for sensing a property. The method 60 calls for (step 61) drawing the optical fiber 31 sensitive to ultraviolet light. Further, the method 60 calls for (step 62) changing an angle of the phase mask 42 with respect to the optical fiber 31. Further, the method 60 calls for (step 63) illuminating the optical fiber 31 with ultraviolet light through the phase mask 42 to produce the series of the fiber Bragg gratings 32.

In support of the teachings herein, various analysis components may be used, including a digital and/or an analog system. For example, the OFDR processor 8 can include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a fiber optic communication cable, fiber optic splice, fiber optic splice housing, bracket to secure components to a structure or tubular, adhesive to secure the fiber optic sensor 10 to the structure 9, a power supply (e.g., at least one of a generator, a remote supply and a battery), cooling component, heating component, sensor, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The adjectives "first," "second," "third," etc. are used to distinguish elements and are not used to depict a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for determining a property of a structure, the apparatus comprising:
    an optical fiber coupled to the structure and comprising a series of fiber Bragg gratings, each fiber Bragg grating in the series being characterized by a light reflection frequency at which the fiber Bragg grating reflects light; wherein:
    the light reflection frequency for each fiber Bragg grating is different from the light reflection frequency of each adjacent fiber Bragg grating to minimize resonance of light between at least two of the fiber Bragg gratings in the series;
    at least two fiber Bragg gratings in the series have light reflection frequencies that overlap; and
    a change in the light reflection frequency of each fiber Bragg grating in the series is related to the property at the location of the each fiber Bragg grating.

2. The apparatus of claim 1, wherein the overlap results from the series of fiber Bragg gratings having a respective series of light reflection frequencies varying between a minimum light reflection frequency and a maximum light reflection frequency.

3. The apparatus of claim 1, wherein the difference between the light reflection frequencies of the adjacent fiber Bragg gratings results from one fiber Bragg grating having an angle of changes in refractive indices etched across a width of the optical fiber that is different from the angle of the adjacent fiber Bragg grating.

4. The apparatus of claim 3, wherein the angle varies from minus one degree to plus one degree with zero degrees being perpendicular to an optical axis of the optical fiber.

5. The apparatus of claim 1, wherein the difference between the light reflection frequencies of the adjacent fiber Bragg gratings results from one fiber Bragg grating having a series of spacings of changes in refractive index etched into the optical fiber that is different from the series of the spacings of changes in the refractive index of the adjacent fiber Bragg grating.

6. The apparatus of claim 1, wherein a total reflective index of the optical fiber is less than twenty percent.

7. The apparatus of claim 6, wherein the total reflective index of the optical fiber is less than fifteen percent.

8. The apparatus of claim 1, wherein the property comprises a strain experienced by the structure.

9. The apparatus of claim 8, wherein the structure is disposed in a borehole penetrating the earth.

10. A method for determining a property of a structure, the method comprising:
    disposing an optical fiber coupled to the structure and comprising a series of fiber Bragg gratings at a location of the property, each fiber Bragg grating in the series being characterized by a light reflection frequency at which the fiber Bragg grating reflects light, wherein: the light reflection frequency for each fiber Bragg grating is different from the light reflection frequency of each adjacent fiber Bragg grating to minimize resonance of light between at least two of the fiber Bragg gratings in the series, at least two fiber Bragg gratings in the series have light reflection frequencies that overlap, and a change in the light reflection frequency of each fiber Bragg grating in the series is related to the property at the location of the each fiber Bragg grating;
    determining a change in the light reflection frequency for at least one of the fiber Bragg gratings in the series resulting from a measurement of the property; and
    relating the change to the property.

11. The method of claim 10, further comprising disposing the structure in a borehole penetrating the earth.

12. The method of claim 9, further comprising protecting the optical fiber from an environment in the borehole.

13. The method of claim 10, wherein the property is a strain experienced by the structure.

14. A method for producing a sensor for sensing a property, the method comprising:
drawing an optical fiber sensitive to ultraviolet light;
changing an angle of a phase mask with respect to the optical fiber; and
illuminating the optical fiber with ultraviolet light through the phase mask to produce a series of fiber Bragg gratings; wherein:
the light reflection frequency for each fiber Bragg grating is different from the light reflection frequency of each adjacent fiber Bragg grating to minimize resonance of light between at least two of the fiber Bragg gratings in the series, each fiber Bragg grating in the series being characterized by a light reflection frequency at which the fiber Bragg grating reflects light;
at least two fiber Bragg gratings in the series have light reflection frequencies that overlap; and
a change in the light reflection frequency of each fiber Bragg grating in the series is related to the property at the location of the each fiber Bragg grating.

15. The method of claim 14, wherein the angle varies continuously between minus one degree and plus one degree with zero degrees being perpendicular to an optical axis of the optical fiber and the illuminating comprises a series of pulses of the ultraviolet light.

16. The method of claim 15, wherein the changing comprises oscillating the phase mask about an axis perpendicular to a longitudinal axis of the optical fiber.

17. The method of claim 14, wherein the optical fiber is drawn from a furnace.

* * * * *